April 30, 1968  J. BAXTER, JR., ET AL  3,380,675
FILAMENT WINDING MACHINE
Filed Feb. 5, 1965  9 Sheets-Sheet 1
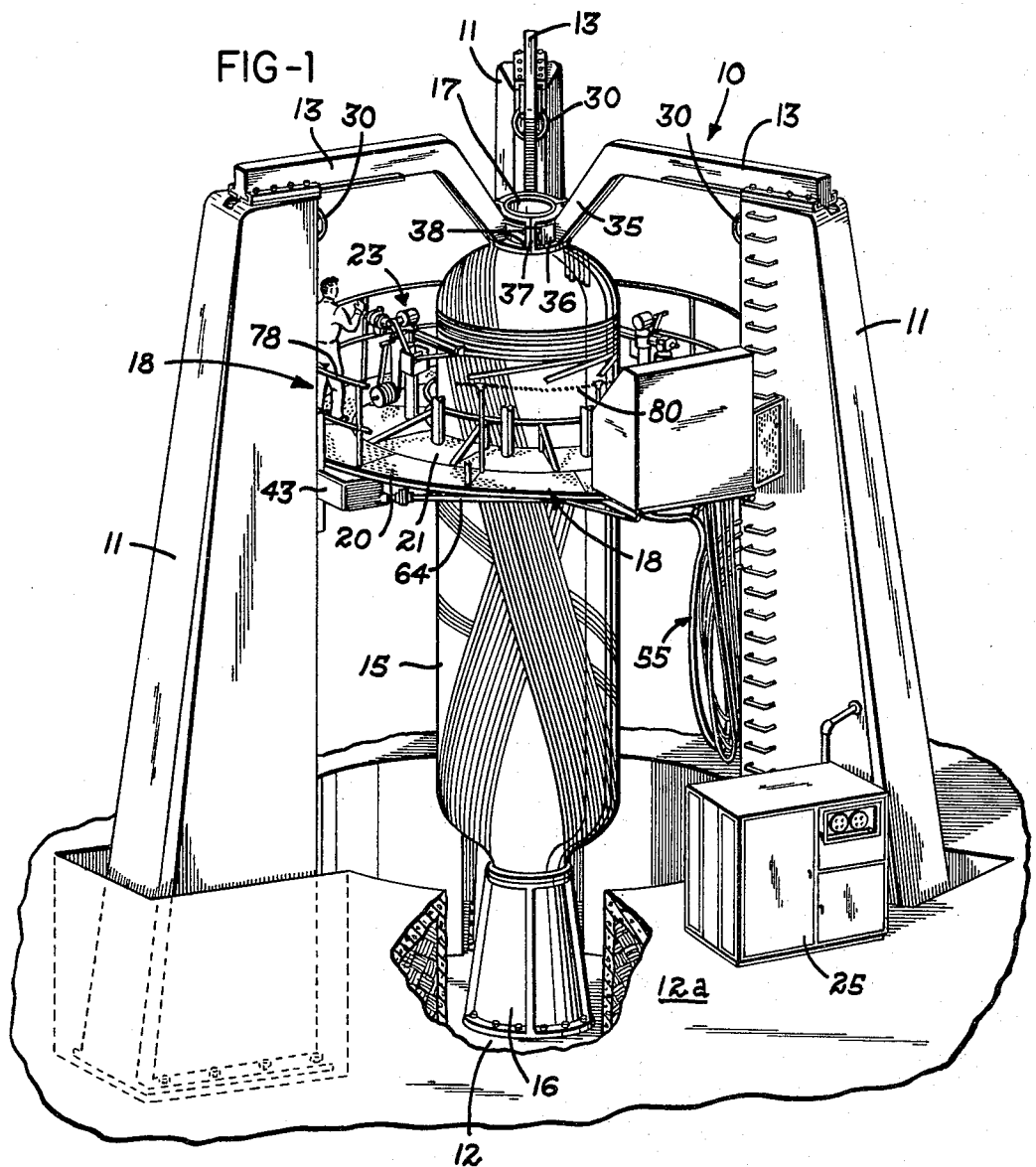
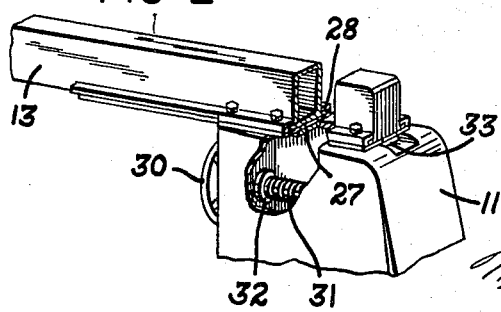
INVENTORS
JOSEPH BAXTER, JR.,
FRANK W. FRUITMAN &
RICHARD W. PHELPS
ATTORNEYS

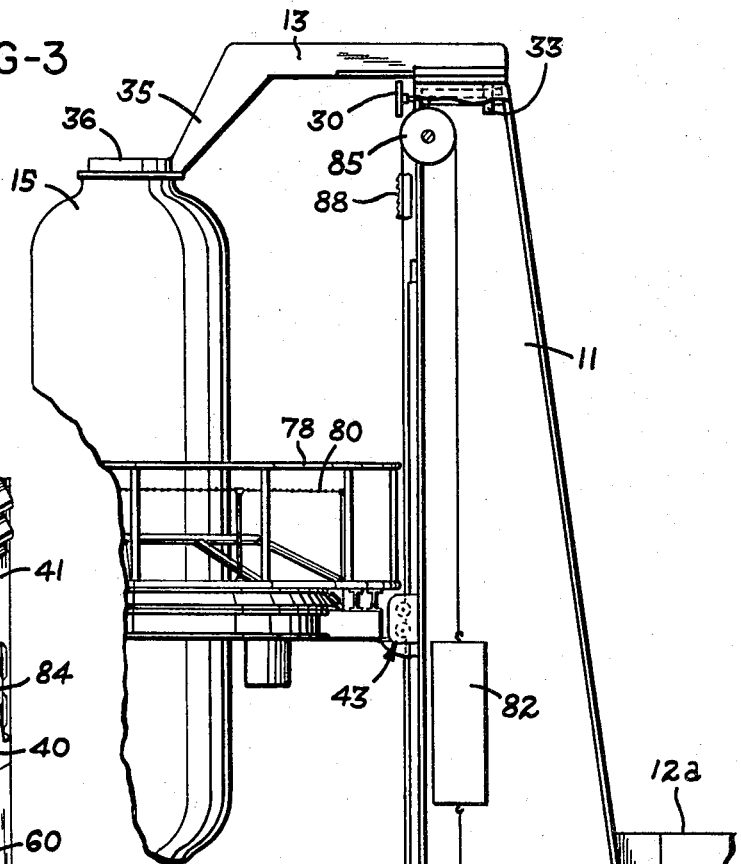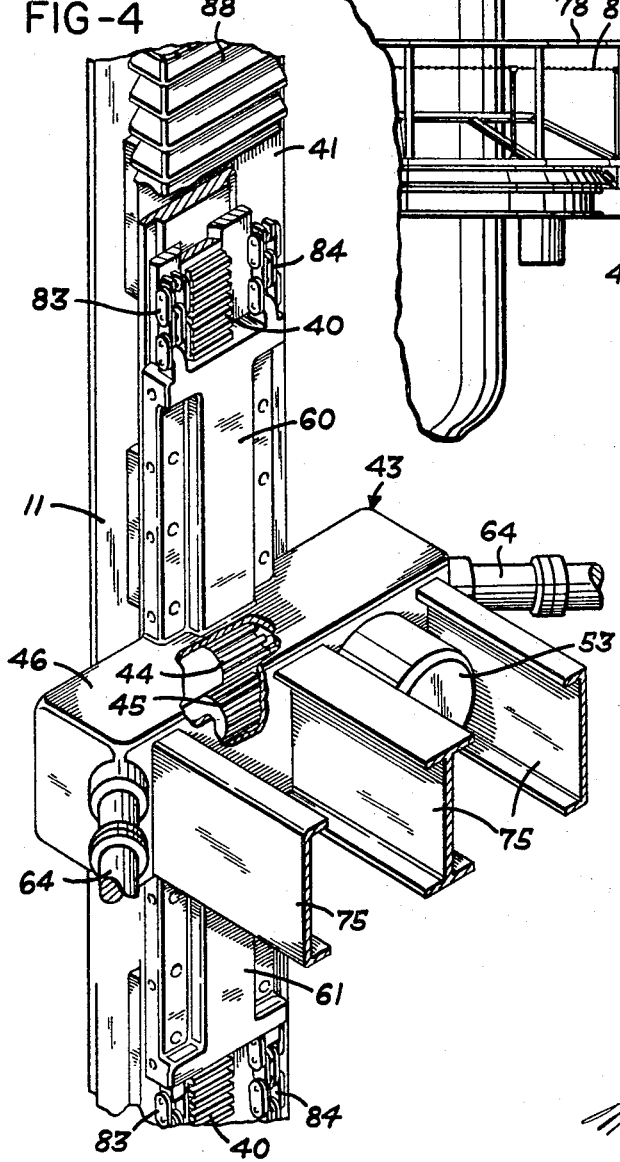

April 30, 1968 J. BAXTER, JR., ET AL 3,380,675
FILAMENT WINDING MACHINE
Filed Feb. 5, 1965 9 Sheets-Sheet 3
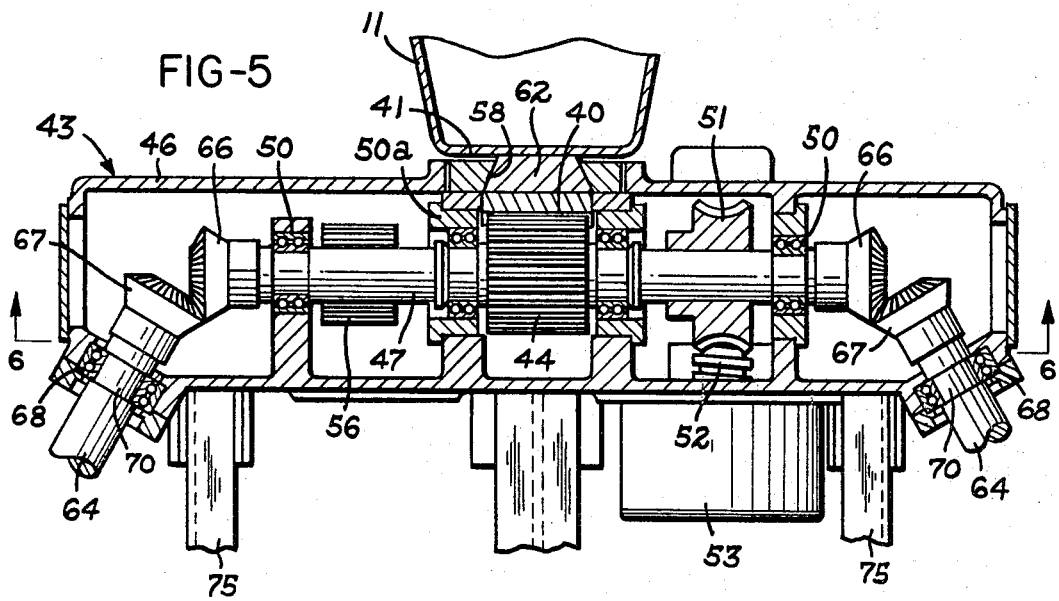
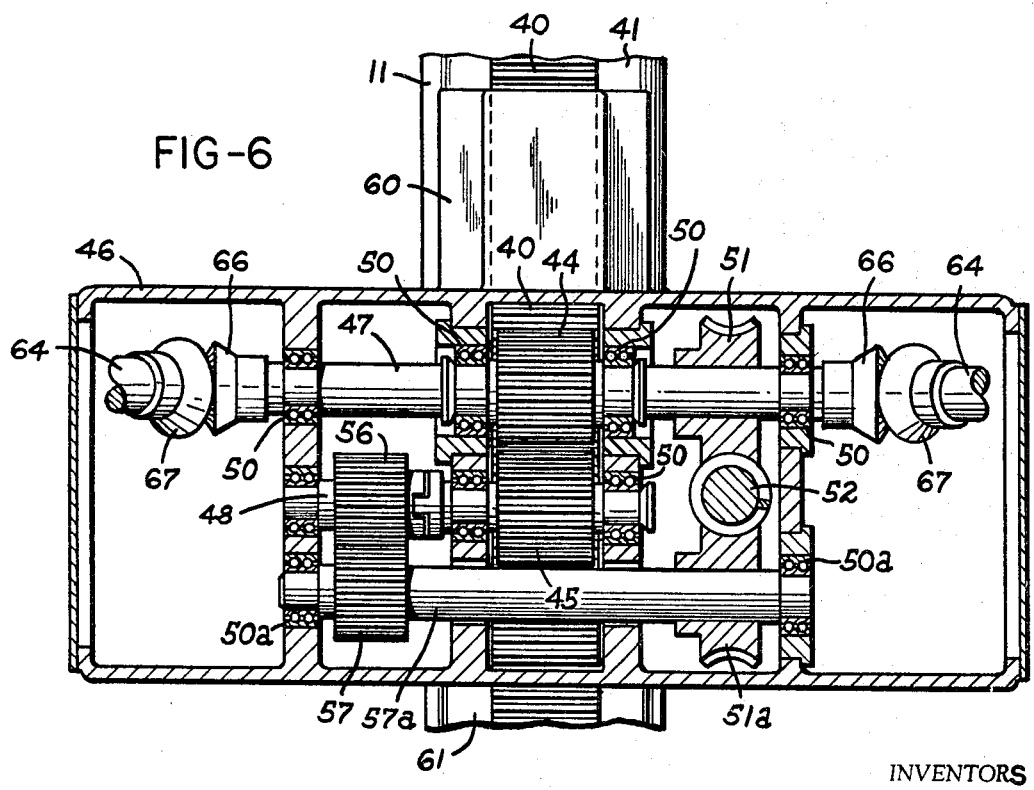
INVENTORS
JOSEPH BAXTER, JR.,
FRANK W. FRUITMAN &
RICHARD W. PHELPS
Marechal, Biebel, French & Bugg
ATTORNEYS

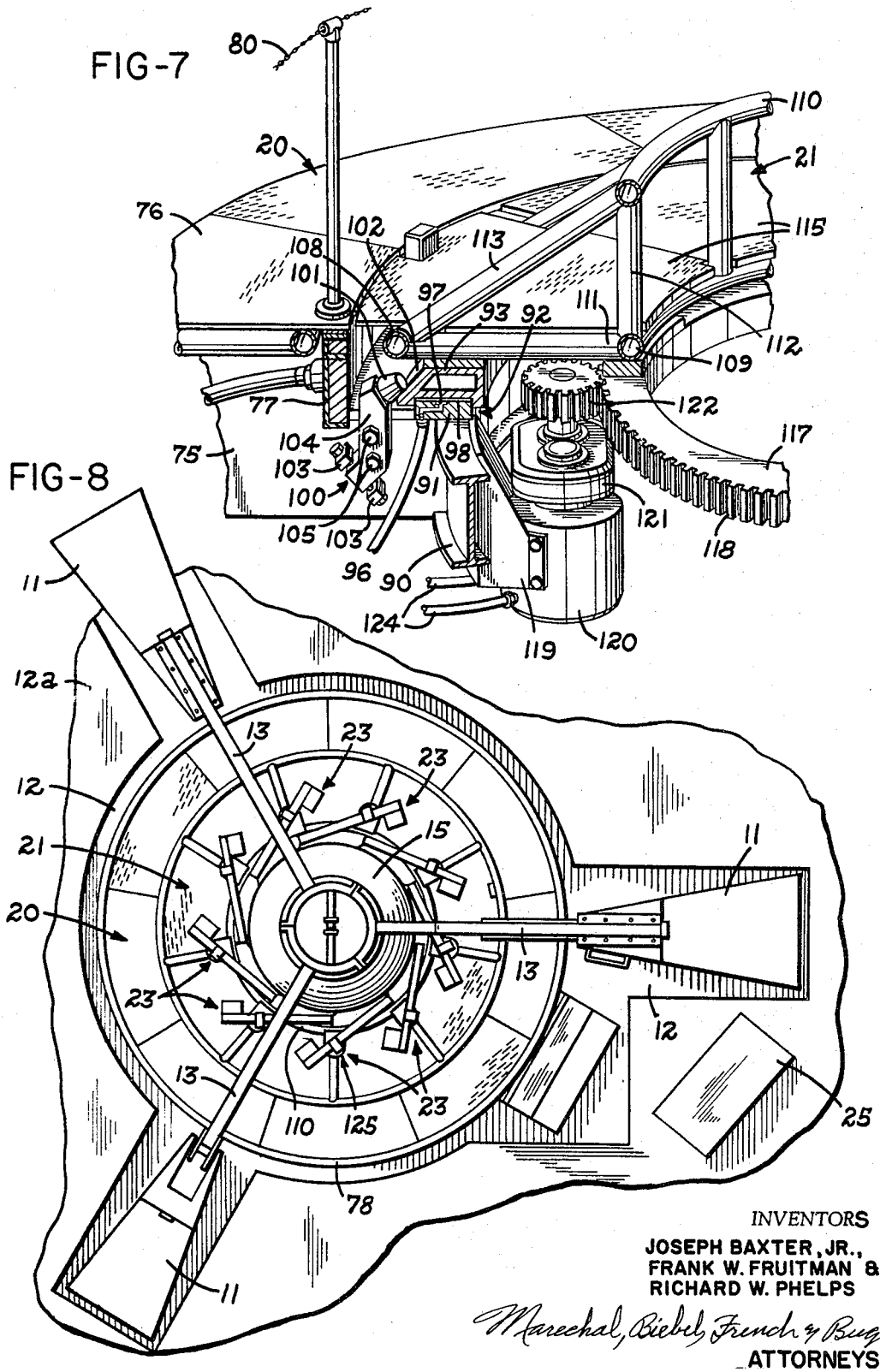

April 30, 1968 J. BAXTER, JR., ET AL 3,380,675
FILAMENT WINDING MACHINE

INVENTORS
JOSEPH BAXTER, JR.,
FRANK W. FRUITMAN &
RICHARD W. PHELPS

ATTORNEYS

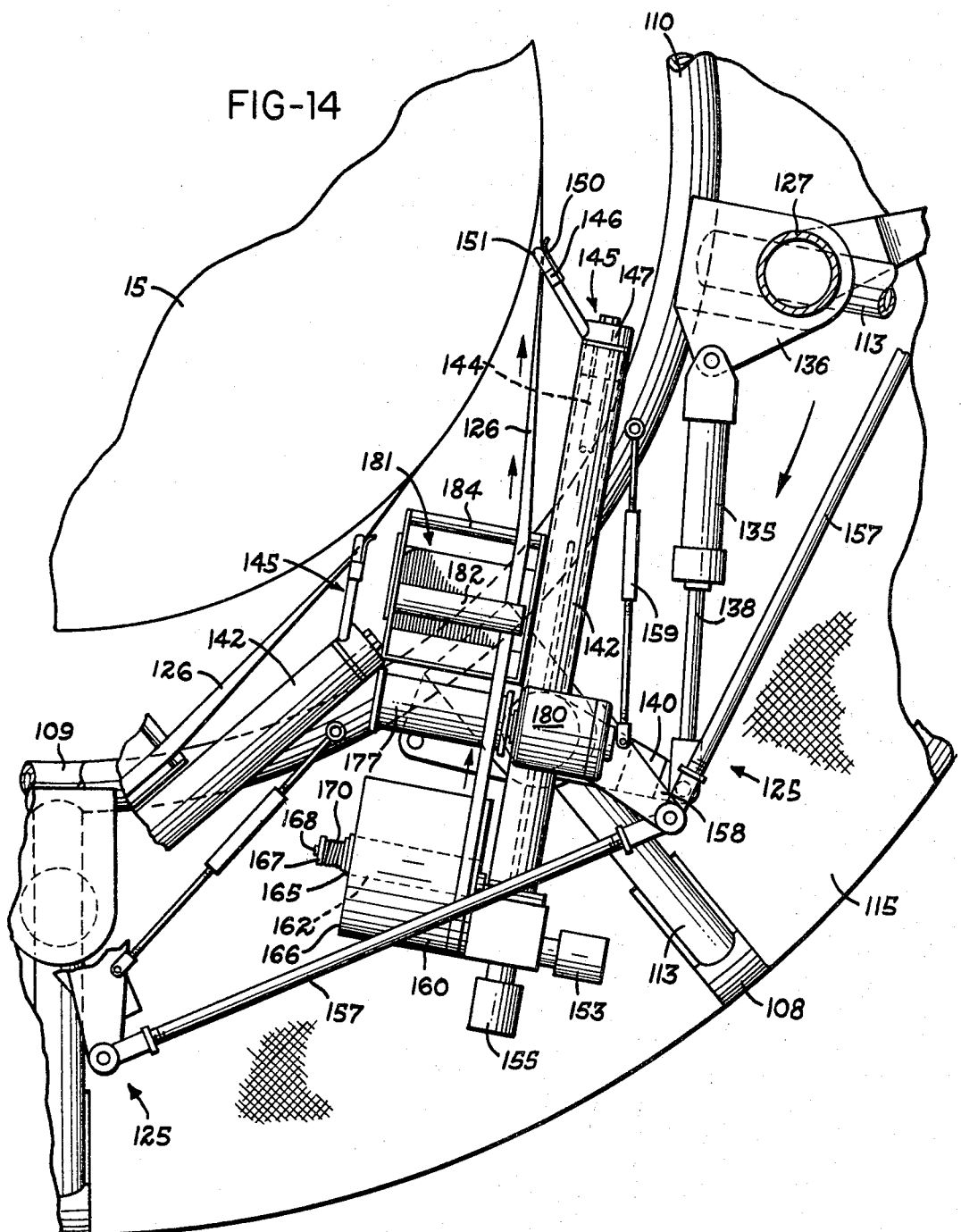

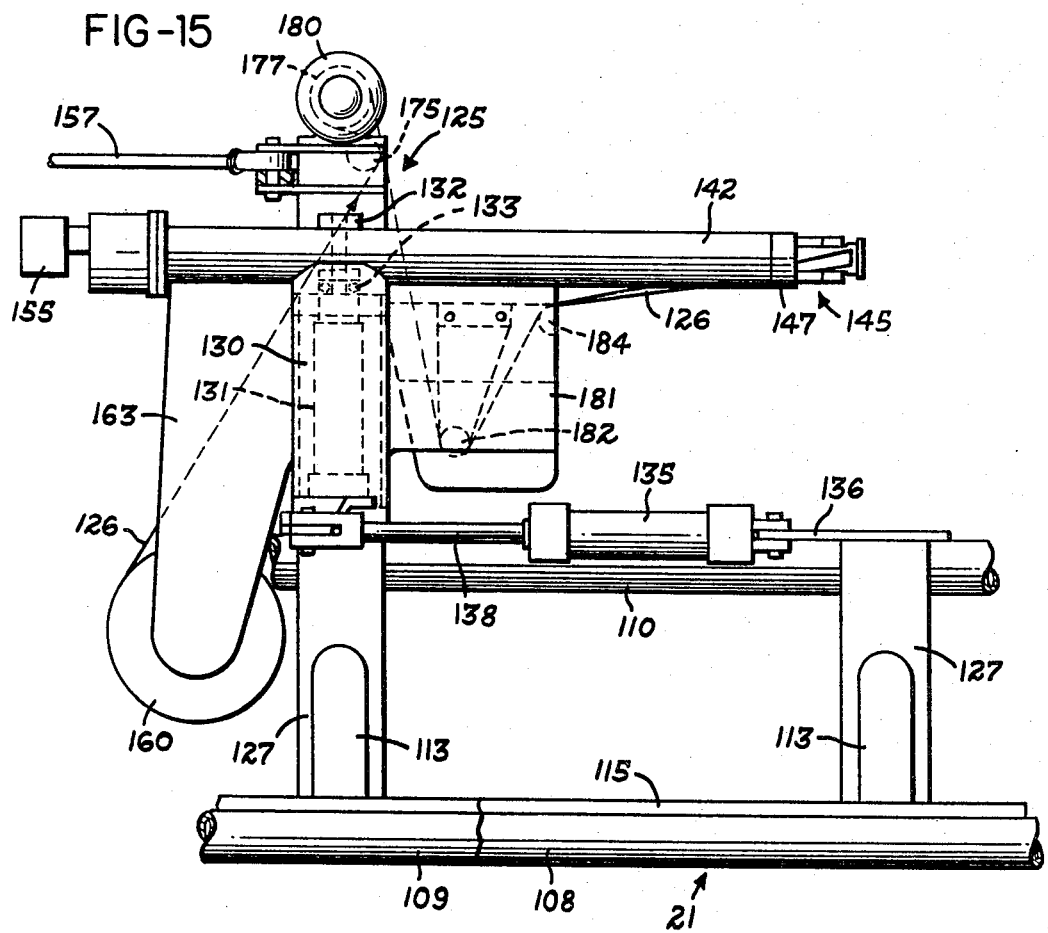
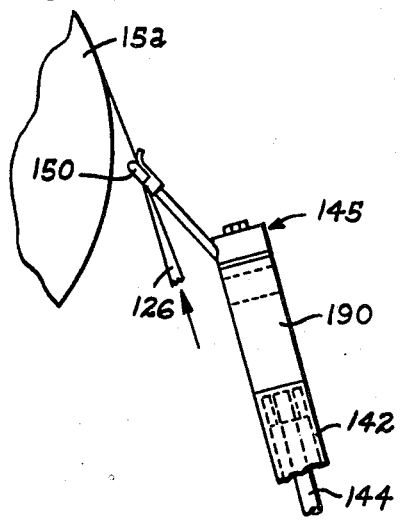

April 30, 1968  J. BAXTER, JR., ET AL  3,380,675
FILAMENT WINDING MACHINE
Filed Feb. 5, 1965  9 Sheets-Sheet 8

INVENTORS
JOSEPH BAXTER, JR.,
FRANK W. FRUITMAN,
RICHARD W. PHELPS

Marechal, Biebel, French & Bugg
ATTORNEYS

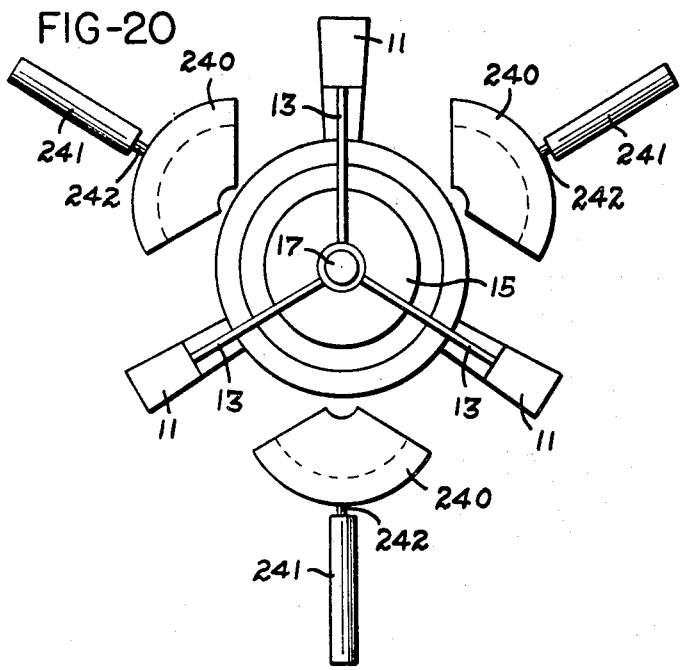
FIG-20
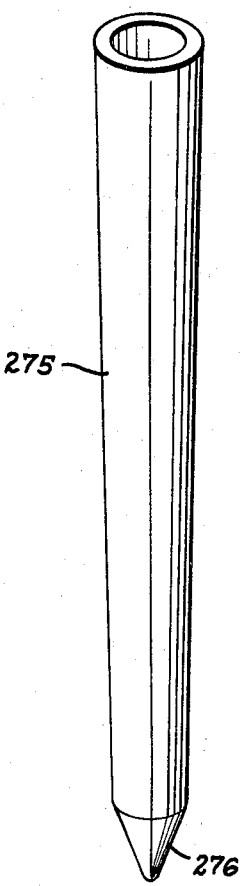
FIG-22
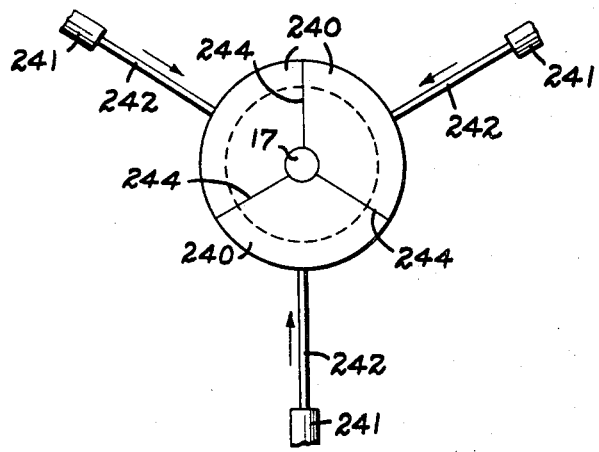
FIG-21
FIG-23
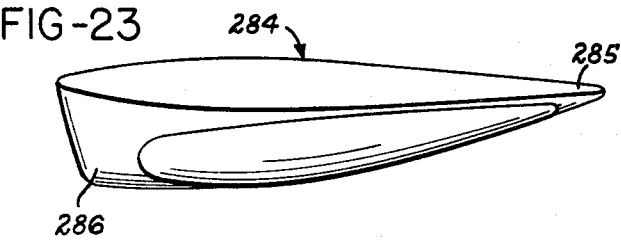
INVENTORS
JOSEPH BAXTER, JR.,
FRANK W. FRUITMAN &
RICHARD W. PHELPS
ATTORNEYS

United States Patent Office 3,380,675
Patented Apr. 30, 1968

3,380,675
FILAMENT WINDING MACHINE
Joseph Baxter, Jr., Franklin, Ohio, Frank W. Fruitman, Arlington County, Va., and Richard W. Phelps, Fulton, N.Y., assignors to The Black Clawson Company, Hamilton, Ohio, a corporation of Ohio
Filed Feb. 5, 1965, Ser. No. 430,702
11 Claims. (Cl. 242—7)

This invention relates to apparatus for winding continuous filaments to form objects of varying sizes and configurations.

The use of continuous glass fibers and other filament type materials has been found very satisfactory in the formation of vessels of various types, since the strength to weight ratio is substantially less than that of comparable metallic vessels. In particular, this factor has led to the use of glass filament rocket motors for propelling ballistic missiles and satellite vehicles into orbit. Additionally, these vessels are corrosion resistant, can be shaped into different configurations, and can be made of substantially any thickness by merely winding additional filaments on a mandrel.

Accordingly, an important object of this invention is to provide high speed apparatus for winding continuous filaments into a monolithic structure, and particularly to provide apparatus of this type which can form structures having a wide range of shapes and sizes without any substantial modification of such apparatus.

Another object of the invention is to provide an improved filament winding machine wherein sides and ends of both large and small objects can be wound with extreme accuracy of placement so that voids are not created in the finished product and a very strong object is produced, and further to provide such a machine which can apply and smooth a coating to the mandrel prior to winding and then machine finish the outer surface of the object after the winding and curing operations are completed.

A further object of this invention is to provide a filament winding machine which can apply either single strands or woven tapes to a mandrel having substantially any configuration, and particularly to provide an inexpensive such machine of simplified design for dependable operation.

A still further object of this invention is to provide a filament winding machine with a retractable heating enclosure for curing the resins used to bond the fibers together, and also to provide an automatic control system which precisely controls the winding of the filaments so that they are accurately applied in the desired thickness and pattern.

It is also an object of this invention to provide a filament winding machine having a large number of payoff stations each of which applies a tape or filament tangentially to the mandrel, and particularly to provide each of the payoff stations with arms which automatically move in four directions to position a payoff head closely adjacent the mandrel.

Another object of this invention is to provide a filament winding machine having payoff head assemblies which move automatically in synchronization with the shape of the mandrel so that the filaments are accurately applied to the mandrel in a predetermined position with a preset amount of tension applied thereto at all times.

Another object of this invention is to provide a filament winding machine which is capable of being easily assembled, disassembled, and transported so that large objects can be formed in place, and also to provide such a machine which has arms capable of winding both the sides and ends of a mandrel.

A further object of this invention is to provide apparatus for winding continuous strands onto a relatively weak mandrel incapable of withstanding torsional or sheer forces without deformation, and further to provide such apparatus for use with mandrels which can be fabricated, constructed of core sand, are chemically soluble, or are inflatable to facilitate removal from the finished product.

Other objects and advantages of the invention will be apparent from the following description, the accompanying drawings and the appended claims.

In the drawings:

FIG. 1 is a perspective view showing filament winding apparatus in accordance with the invention;

FIG. 2 is an enlarged perspective view, partially broken away, showing the top portion of the support structure of the apparatus of FIG. 1;

FIG. 3 is a partial side elevation view of the support structure;

FIG. 4 is a perspective view partially broken away of the carriage elevating mechanism in the apparatus of FIG. 1;

FIG. 5 is a sectional view through the elevating mechanism;

FIG. 6 is a sectional view taken along the line 6—6 of FIG. 5;

FIG. 7 is a perspective view, partially broken away, showing the manner in which the rotating table is supported and driven in the apparatus of FIG. 1;

FIG. 8 is a plan view of the invention showing the location of the payoff stations in the apparatus of FIG. 1;

FIG. 14 is an enlarged fragmentary plan view of one of the payoff stations of FIG. 9;

FIG. 15 is a side elevation view of one of the payoff stations of FIG. 9;

FIG. 16 is an enlarged plan view showing a modified payoff head applying a filament to the mandrel;

FIGS. 20 and 21 are plan views of an enclosure for the mandrel shown in the retracted and operative positions, respectively;

FIG. 22 is a perspective view of a taped tubular member which can be produced by the invention; and FIG. 23 is a perspective view of a submarine hull which can be formed by the apparatus of the invention.

Figure 9:
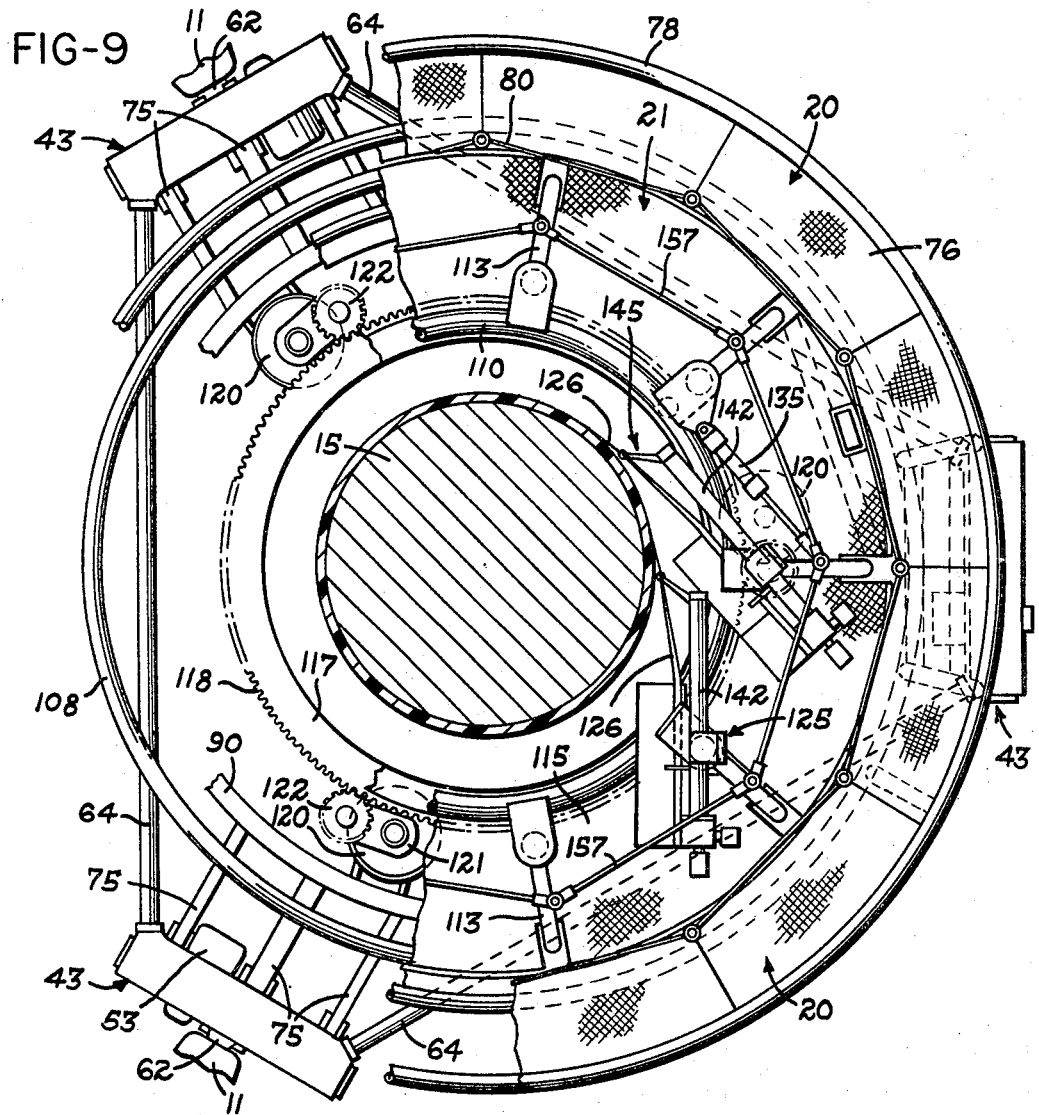
FIG. 9 is an enlarged plan view partially in section taken immediately above the payoff stations.

In general, this invention is adapted to apply to continuous tape of glass fiber which is preimpregnated or which has passed through an epoxy resin tank to the outer surface of a stationary mandrel. The tape is applied by moving an outer table vertically at high speed on a plurality of vertical columns. The outer table carries a rotating inner table having a plurality of payoff heads thereon which apply the tape tangentially to the mandrel under a preset tension. The apparatus can be used in the construction of the mandrel, by applying a coating to form a smooth outer surface on the mandrel, as well as by machining this coating. While the invention is shown and described as applying the tape to a vertical and stationary mandrel, it is within the scope of the invention to use a rotating or horizontal mandrel, as well as to wrap other flexible strands or tapes around the mandrel.

Referring now to the drawings, wherein preferred embodiments of the invention are shown, FIG. 1 illustrates the filament winding machine 10 which includes three uniformly spaced vertical columns 11 rigidly secured at their base to the floor 12 and interconnected at the top by the three cross members 13. The mandrel 15 is supported in the center of the three columns 11 on the pedestal 16 which is also rigidly secured to the floor 12, and the upper end 17 of this mandrel is rigidly clamped to the cross members 13.

The vertical columns 11 support a carriage assembly 18 including a vertically movable non-rotating table 20 which surrounds and supports a rotating table 21, and these tables cooperate to move vertically and circumferentially of the mandrel 15. The floor 12 is recessed as shown in FIG. 1, so that the tables 20 and 21 can be lowered to the level of the upper surface 12a to facilitate loading of the tables.

The rotating table 21 has a plurality of payoff stations 23 (FIG. 3) supported thereon which apply the filaments to the outer surface of the mandrel 15 in a precisely predetermined pattern and under a predetermined tension, as will be further explained. The entire operation of the machine 10 is automatically controlled through the computing device 25, for example, a punched tape system which controls the electrical and fluid pressure systems to position the various components of the invention.

Each of the cross arms 13 is adjustably movable in a radial direction with a respect to the mandrel 15 so that mandrels of different sizes can be easily accommodated thereby. As shown in FIGS. 2 and 3, the cross arms 13 each has a dovetail projection 27 on the lower surface thereof which is received in the complementary groove 28 in the top surface of the vertical columns 11 thereby enabling the cross arm to slide in a precisely controlled radial direction. A hand wheel 30 is secured to the screw 31 which extends through the threaded support bearings 32 secured in the columns 11 below the cross arms 13, and the upwardly extending bracket 33 is secured to the lowermost portion of the dovetail projection 27 so that rotation of the hand wheel 30 causes the cross arm to be moved toward and away from the mandrel 15. Suitable means, not shown, may be provided for locking each of the hand wheels 30 in position once it is properly set.

Each of the arms 13 has a downwardly extending inner end portion 35 (FIG. 1) terminating in a curved segment 36, and these segments 36 cooperate to extend around the upper end 17 of the mandrel 15. Suitable flanges 37 are provided on these segments 36 so that they may be secured together by the bolts 38, and thus they form a substantially rigid support for the upper end 17 of the mandrel when it is in place and the segments 36 are secured together.

*Carriage assembly*

As noted above, the carriage assembly 18 includes both a non-rotating outer table 20 and a rotating inner table 21. The outer table 20 extends circumferentially around the mandrel 15 and forms a walkway on which the operator can observe and control the operation of the machine 10. The table 20 has an outer diameter (see FIG. 9) which is slightly less than the spacing between the innermost portion of the three columns 11, and this table is secured to the vertical columns 11 by use of a rack 40 secured to the inner surface 41 of each of these columns and engaged by the three drive assemblies 43 on the nonrotating table 20.

Each of the drive assemblies 43 is hydraulically driven by its individual motor 53 for supplying power to raise and lower the table 20. As shown in FIGS. 4–6, each of the assemblies 43 includes two separate pinions 44 and 45 arranged in the housing 46 one above the other for engaging the rack 40. The pinions 44 and 45 are supported on parallel shafts 47 and 48 which are supported by the bearings 50 and 50a at the ends of the shafts and the bearings 50a on either side of the pinions 44 and 45.

The pinion 44 (FIG. 6) is driven through the gear 51 on the shaft 47 and engages a worm gear 52 of the rotary hydraulic motor 53 secured to the housing 46 and receiving hydraulic pressure from a suitable source through the hoses 55 (FIG. 1). The pinion 45 is driven through the gear 51a, the elongated shaft 57a supported in the bearings 50a, and the drive pinion 56 and backlash preventing gear 57 mounted on the left-hand portion of the shaft 48, as shown in FIG. 6. The teeth of the gear and pinion 56 and 57 are continually in contact regardless of the direction of movement thereof, and as a result, backlash is substantially eliminated in the drive assemblies 43 thereby permitting smooth and noise-free changes of speed and direction.

At least one of the drive assemblies 43 has a dovetail groove 58 formed in the guide extensions 60 and 61 (FIG. 4) above and below the housing 46 for receiving the complementary projection 62 on the associated column 11 behind the gear rack 40 to guide the table movement and prohibit rotation thereof. The synchronizing rods 64 extend between each of the drive assemblies 43 and tie them together to insure that the pinions 44 and 45 move together for controlled vertical movement. As shown in FIG. 5, the bevel gears 66 and 67 are provided on the ends of the shafts 47 and the rods 64 so that they rotate together to insure that each of the assemblies 43 moves at the same rate. The rods 64 are held against axial movement and are supported for rotation by the bearings 68 which engage the annular recess 70 in each rod 64.

Each of the drive assembly housings 46 has the supporting I-beam members 75 extending therefrom and the table floor 76 is secured rigidly thereon. At the inner end of the members 75 is secured an annular channel 77 which supports the inner portion of the floor 76, as shown best in FIG. 7. The hand rails 78 and guard chains 80 are provided on the nonrotating table 20 for safety purposes.

The carriage assembly 18 is counterbalanced in each of the columns 11 so that a minimum of force is required to move the assembly in a vertical direction to permit precision control thereof at all times. The counterweight system includes a counterweight mass 82 in each column secured to the parallel metal chains 83 and 84 (FIGS. 3 and 4) which extend over the sprockets 85 and 86 at the top and bottom, respectively, of the columns 11, and the ends thereof are secured to the extensions 60 and 61 on the gear housings 43, as indicated in FIG. 4. These chains ride on either side of the rack 40 and are at all times covered by the collapsible boots 88 so that the rack 40, the pinions 44 and 45, and the chains 83 and 84 are not contaminated during operation. Thus the boots 88 above each of the drive assemblies 43 are compressed or telescoped together when the carriage assembly 18 is near the top of the columns 11, and are fully extended when the carriage assembly 18 is near the bottom of these columns.

The inner table 21 is carried by and rotates on the outer table 20, as indicated above, so that the two move together in a vertical direction. The supporting structure includes the inwardly radially extending frame members 75 which are disposed at spaced intervals around and beneath the outer table 20. These members carry an annular I-beam 90 upon which is supported the male portion 91 of an air bearing 92. The female portion 93 of this bearing is also annular and is received on and supported by the male portion 91 thereof, as shown in FIG. 7. Both the male and female portions are machined to close tolerances and construction of bearing material for frictionless operation. When air is supplied through the hose 96 and the opening 97 in the male portion 91, the female portion 93 is raised with respect thereto so that the space 98 is created thus reducing or eliminating metal to metal contact so that friction is reduced for smoother operation.

Upward movement of the female portion 93 of the air bearing is limited by the S-shaped retainers 100 which are disposed at spaced intervals around the inner table 21 and have the rollers 101 which engage the tapered surface 102 of the female portion 93. Slight adjustment can be made in the position of the rollers 101 to vary the spacing between the bearing components by adjusting the screws 103 to effect pivotal movement of the support bars 104 about the support pins 105. After the adjustment is made, the bars 104 are rigidly locked in place by retightening the screws 103, and thus the inner table 21 is capable of rotating very accurately and smoothly within the outer table 20.

The structure of the inner table 21 includes the annular support tubes 108, 109, and 110 which are carried on the female portion 93 of the air bearing by the triangular interconnecting members 111, 112, and 113. The area between the interconnecting members 111 is covered with metal plates 115 so that an operator can stand thereon during set-up and maintenance of the machine. The innermost portion of this table carries an annular rack 117 which is rigidly secured thereto and has the teeth 118 on the outer circumference thereof. The annular beam 90 of the outer table 20 has a bracket 119 thereon, as shown in FIG. 7, which supports the hydraulic motor 120 having the gear box 121 thereon for effecting rotation of the drive pinion 122 which engages and drives the circular rack 117 and thus the inner table 21. Hydraulic pressure is supplied to the motor 120 through the hoses 124 which are connected through the control device 25 so that the speed of rotation of the table 21 corresponds precisely to that required to wind the pattern desired. Suitable slip rings (not shown) supply control signals and electrical current from the outer table 20 to pumps and valves on the inner table 21 to generate pressure for operating the payoff head assemblies 125.

*Payoff head assemblies*

As shown in FIGS. 8 and 9, the inner table 21 carries a plurality of payoff head assemblies 125 each of which applies filament tape 126 of material to the mandrel 15. Since the payoff head assemblies are essentially identical, only one is described in detail. Accordingly, referring to FIG. 15, each assembly 125 includes a upright post 127 which is welded to the spaced annular tubes 109 and 110 and has the reinforcing tube 113 extending therethrough to secure it rigidly in its upright position. The upper portion of the post 127 has an outer sleeve 130 rotatably and removably secured to the central pin 131 which is secured to the post 127 by the nut 132. The bearings 133 are provided for frictionless rotation of the sleeve 130 by the hydraulic cylinder 135 which is secured by the bracket 136 and post 137 to the table 21, and has the piston rod 138 connected to the radially extending bracket 140 on the sleeve 130.

The upper portion of the sleeve 130 has an elongated hollow payoff arm 142 rigidly secured thereto, and this arm has a shaft 144 disposed centrally thereof with a payoff head 145 mounted at the end thereof. The head includes a U-shaped guide ring 146 (FIG. 14) which extends from the end bracket 147 on the shaft 144 to a position adjacent the mandrel 15. This U-shaped ring has a retainer 150 on the end thereof so that the tape 126 is held between the end portion 151 of the ring 146 and the retainer 150 at all times.

As indicated above, the guide ring 146 is mounted on a bracket 147 which is rotatably mounted in the tubular arm 142 by a shaft 144 which connects to the hydraulic motor 153 at the other end. This motor serves to rotate the guide ring 146 through 180°, so that the tape 126 is always deposited "flat" on the surface of the mandrel 15, and the tension in the tape is always tangent to the surface to assure that sideways slip cannot take place. This feature is especially important when winding longitudinally of the mandrel, and when progressing over the dome shaped curves thereof.

A horizontal vertical feed-back monitor 155 is also provided on the shorter end of the arm 142 for sensing the movement thereof and supplying an appropriate signal to the control device 25. Each of the arms 142 is rigidly tied to each of the adjacent payoff head assemblies 125 by the tie rods 157 which extend from pivotal connection with the brackets 158 on the top of the sleeves 130. Thus each of the payoff head assemblies 125 moves together about the axis of the associated sleeve 130 to position the guide rings 146 equal distances from the mandrel 15. The radial position feed-back rods 159 are interposed between the frame member 110 and the brackets 158 to supply a signal to the control device 25 indicative of the position of the associated arm 142. The feed-back rods 159 telescope together and thus sense the movement of the brackets 158 to supply a signal to the control device indicating that the cylinder 135 has properly positioned the arms 142.

Each payoff head assembly 125 also includes a spool 160 (FIG. 15) of fiberglass or the like mounted on a mandrel 162 which is in turn supported on the downwardly extending bracket 163 rigidly secured to the sleeve 130 and arm 142. This mandrel 162 has a plate 165 (FIG. 14) which engages frictionally the end surface 166 so that a preset amount of drag is applied to the spool 160 to prevent coasting thereof. The pressure on the plate 165 can be varied by adjusting the nut 167 on the threaded shaft 168 so that the pressure of the spring 170 against the plate 165 is proportionally changed. Enough friction is imposed to keep the spool from coasting, when tension on the tape 126 is decreased, and this adjustment is reached experimentally.

From the spool 160 the tape 126 passes upwardly over a wide-faced snubber roll 175, and over the wide-faced capstan 177 which is controlled by a hysteresis type motor 180, so that proper tension is imparted to the tape 126 at all times. From the tension capstan 177 the band 126 passes downwardly into the impregnating tank 181 and under wide-face submerging pin 182, then upward and over the edge 184 of the tank 181 where surplus epoxy is wiped from the band 126 and returned to the tank. The glass band 126 from this point passes to the guide ring 146 at the end of the extended arm 142 and is deposited tangentially onto the surface of the mandrel 15.

The use of wide-face guide members throughout the travel of the tape 126 from the spool 160 until it passes through the eye of the guide ring 146 avoids restraining stresses being imparted to the tape 126, and it is free to choose its own path along the way so as to arrive at the guide ring in a flattened condition. The spool mount 163, guide pins 75 and 182, capstan and motor 177 and 188, epoxy tank 181, and guide ring rotating hydraulic motor 153 are all integrally mounted to the extended arm 142 and the sleeve 130 and move as a unit with it.

As shown in FIG. 16, a spacer sleeve 190 can be secured to the end of each of the arms 142 when a mandrel 15a of a relatively small diameter is being used so that additional length is required in each arm 142 to apply the tape 126 tangentially. This spacer is secured in place by removing the head 145 and securing the spacer sleeve 190 to the rotary shaft 144. The head 145 is then secured to one end of the spacer sleeve 190 by the screw 191 so that rotation of the motor 155 effects rotation of the shaft 144, the spacer sleeve 190, and the guide ring 150. The precise length of the spacer sleeve 190 is dictated by the diameter of the mandrel 15a, and it is within the scope of the invention to add a spacer of any required length.

*Coating and finishing assemblies*

Figure 17:
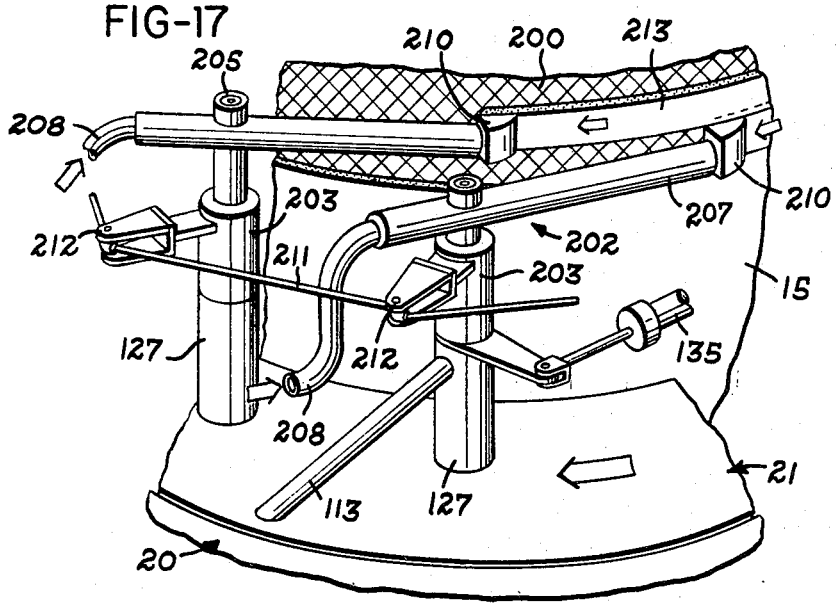
FIG. 17 is a perspective view of the apparatus used to apply a coating to the mandrel.
Figure 18:
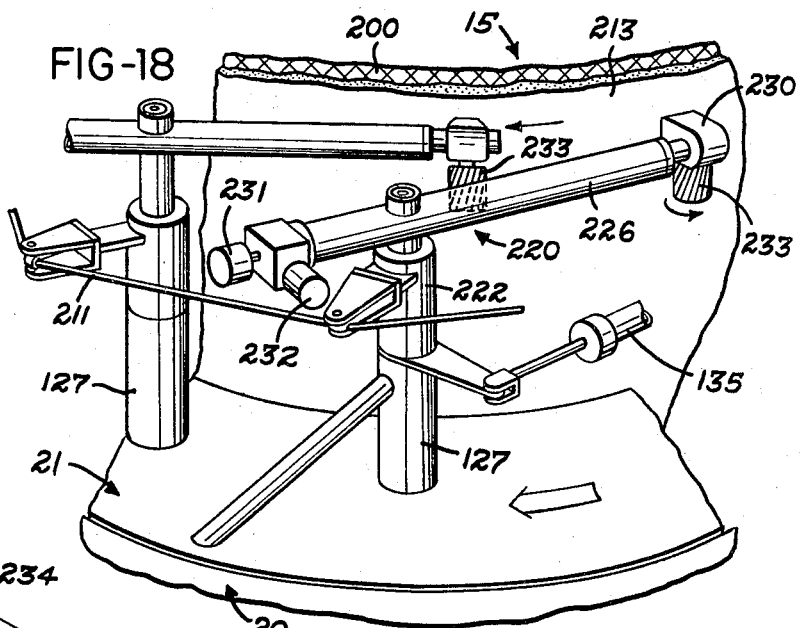
FIG. 18 is a perspective view similar to FIG. 17 showing apparatus for finishing the coating on the mandrel.
Figure 19:
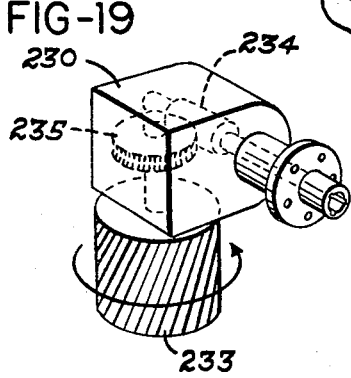
FIG. 19 is an enlarged perspective view of the machining head used with the apparatus shown in FIG. 18.

Referring now to FIGS. 17–19, apparatus is shown for use in applying a plaster coating or the like to the outer surface of the mandrel 15. The mandrel is initially fabricated from metal or wooden parts to conform substantially to the configuration desired, and then the wire mesh 200 is applied to the outer surfaces thereof. Subsequently, the arms 142 are removed from each of the payoff assemblies 125 by removing the connectors 132 and allowing the sleeve 130 and the associated structure to be removed upwardly from the post 127. Then the plaster arm assemblies 202 are placed on the posts 127 by securing the sleeve 203 in place by the threaded connector 205 in substantially the same manner that the arms 142 are secured in place. The bracket 140 which is used to rotate the sleeves 203 and the arms 207 remains in place so that the hydraulic cylinder 135 functions to rotate these arms in the manner described above.

Each arm 207 consists of an elongated hollow tube having a relatively large diameter flexible hose 208 connected to one end thereof and a dispensing head 210 mounted at the other end thereof for close cooperation with the outer surface of the mandrel 15. The heads 210 may be tied together by the tie rods 211 which interconnect the brackets 212 of each of the sleeves 203 in substantially the same manner as described above, or each of these sleeves may be operated by an individual cylinder 135 as required when a non-cylindrical mandrel 15 is being used.

In operation, the inner table 21 is rotated by the control device 25 as heretofore described, and a mixture of water and plaster or its equivalent is pumped through the hoses 208 and into the arms 207 which are moving around the mandrel 15. The dispensing heads 210 apply a layer 213 of plaster to the wire mesh 200 on the surface of the mandrel 15 in predetermined paths so that the entire outer surface has a layer of plaster quickly and evenly applied thereto.

The apparatus shown in FIG. 18 utilizes machining arm assemblies 220 which are secured in place on the posts 127 in the same manner as the arm assemblies 207 described above. That is, each sleeve 222 fits on to a post 127 and the threaded connector 223 locks the sleeve 222 in place. Again the hydraulic cylinder 135 is operable to rotate the assembly 220 about the surface of the sleeve 222, and the tire rods 225 interconnect the brackets 227 on each of the sleeves 222 so that the arms 226 rotate in unison. Here again, however, each of the arm assemblies 220 may be provided with individual cylinders 135 when a mandrel of non-cylindrical configuration is used.

The arms 226 have the machining heads 230 mounted on one end thereof and the hydraulic motors 231 and 232 on the other ends thereof. The motor 231 rotates the head 230 about the axis of the arm 226, and the motor 232 drives the rotary milling cutter 233 through the worm 234 and pinion 235, as shown in FIG. 19. The milling cutters 233 engage the outer surface of the plaster coating 213 which has been applied to the mandrel 15 to smooth the same by removing any irregularities on the surface. The cutters 233 themselves overlap slightly, and by reason of the large number of these heads and the high speed movement of the inner and outer tables 20 and 21, the coating 231 is quickly prepared for receiving the glass filament tape 126 or the like.

*Operation*

After the mandrel 15 is completed and the arms 142 mounted on the posts 127, the spools 160 of the glass fiber tape 126 are mounted on the payoff head assemblies 125, threaded around the tensioning capstans 177, through the resin tanks 181, and through the guides 146 on the end of the arms 142. The preparation also includes the programming of the control device 25 by use of a magnetic tape, punched tape system, or other automatic system which will precisely control the movement of the inner and outer tables 20 and 21, as well as the payoff head assemblies 125.

The ends of the tapes 126 are secured to the mandrel 15, and the control device is then started in operation with the outer table 20 moving vertically and the inner table 21 moving circumferentially of the mandrel 15 and vertically with the outer table 20. In this manner, any combination of patterns can be wound on the mandrel 15 as controlled by the control device 25 acting through the hydraulic motors 53 which drive the outer table 20 and the motors 120 which rotate the inner table 21. The arms 142 move toward and away from the mandrel 15 so that the tape 126 is at all times applied tangentially to the surface of the mandrel even when the tape is applied to the spherical ends thereof. Thus the cylinder 135 rotates the arms 142 about the sleeve 130, and the motors 155 rotate the payoff guide rings 146 with respect to their associated arms 142 so that this guide ring is positioned close to the mandrel 15 and the tape is applied flat and under a preset tension to enable accurate positioning of the tape 126.

As the tables 20 and 21 move about the mandrel 15, the tape 126 is drawn from each of the payoff assemblies 125 and accurately positioned by the guide rings 146 on the surface of the mandrel 15. This winding operation continues unil the desired thickness is formed on the mandrel 15, and it may be necessary to place new spools of tape on the assemblies 125 in order to obtain the desired thickness of the tape on the mandrel. The particular pattern which is formed on the mandrel 15 does not form a part of this invention, and it should be appreciated that substantially any pattern can be wrapped on any surface which is free from concave surfaces. The use of nine payoff assemblies 125 permits a substantial quantity of the glass fiber tape 126 to be applied in minimum time to the mandrel 15, and in order to achieve maximum use of the nine payoff assemblies 125, the inner and outer tables 20 and 21 move at high speeds so that the glass fiber can be applied in a minimum of time.

*Curing enclosure*

FIGS. 20 and 21 illustrate an enclosure for use in thermally curing the resin or other bonding agent to create an integral body from the wound strands or tapes 126. Three elongated housing shells 240 are spaced at equal distances around the mandrel 15 between the vertical members 11. Each of these housing shells 240 is moved into and out of engagement with each other by the hydraulic cylinders 241 or their equivalent, and when the piston rods 242 of the cylinders 241 move the housing shells to their innermost position, as seen in FIG. 21, the edges 244 thereof engage and form a housing around the mandrel 15. Thus the top and bottom of the shells 240 extend radially inwardly to engage the pedestal 16 on the bottom and the support 17 at the top of the mandrel 15. A suitable source of heat (not shown) is then applied to the interior of this housing for the period required to cure the resin and solidify the object being produced. The housing shells 240 are then quickly removed by retracting the rods 242 into the cylinders 241.

Once the winding operation is complete and the resin cured, the arms 13 are retracted to release the upper portion of the mandrel. The support 17 is removed, and the mandrel 15 is disassembled and removed through a suitable opening in the end of the finished product, and the plaster on the inner surface of the finished product can be easily removed by use of water or suitable chemicals so that the inside surface of the finished product is smooth and free of irregularities.

The invention has thus far been described as applying the tape 126 of glass fiber strands to the mandrel 15, but it is within the scope of the invention to use single glass fiber strands since these would be applied in substantially the same manner as the tape 126. Moreover, the invention is not limited to glass fiber strands or tapes but it may be used to apply any type of filament or tape to the mandrel 15 without departing from the scope of the invention. The glass fiber tapes 126 may be preimpregnated with resins, or the resin may be applied by use of the tank 181, and when other strands of other materials are used, a suitable bonding material or means must be provided to adhere the various strands or tapes together.

Figure 10:
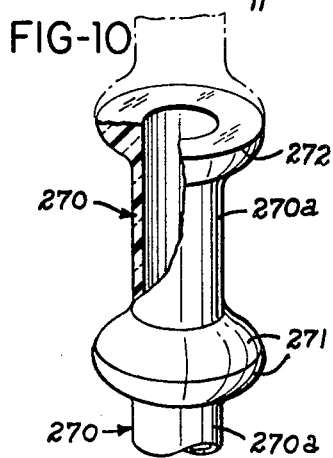
FIGS. 10–13 illustrate various shapes which can be formed by filament winding apparatus in accordance with the invention.

While FIGS. 1–9, and 14–16 illustrate the making of cylindrical objects, such as a pressure tank or missile casing, it is possible to construct numerous other configuration with this apparatus. Accordingly, as shown in FIG. 10, an elongated cylindrical object 270 having a uniform inside diameter and the enlarged smoothly rounded projections 271 on the outside surface thereof can be formed. When the finished object 270 is cut along the lines 272 diametrically through the projections 271, pipe sections 270a are formed which can be easily secured together when being assembled in to a pipe line, for example, by an epoxy resin. Such pipe is corrosion resistant and flexible so that it will convey most gases and liquids through the ground or through bodies of water indefinitely.

A tapered column 275 having a pointed end 276, as shown in FIG. 22, can be similarly produced by this apparatus. Like the cylindrical object 270, it is merely necessary to program the control device 25 so that the strands 126 are applied to the outside surface of an appropriately shaped mandrel which has an outer configuration equal to the inside configuration desired. Where thicker wall portions are desired, as in the projection 271 of the pipe 270a, it is merely necessary to program the control device 25 so that a suitable number of additional layers of filaments are applied in these areas. The pipe sections 270a and tapered column 275 also demonstrate the wide variation of sizes which can be made by the invention. The pipe section may be a few inches in diameter and several feet in length, whereas the column may be many feet in diameter and more than fifty or sixty feet tall thereby making it suitable for use as piling for a ship dock at a salt water seaport.

Figure 11:
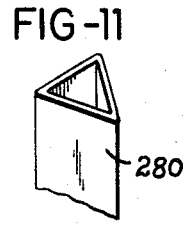
Figure 12:
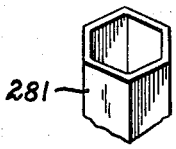
Figure 13:
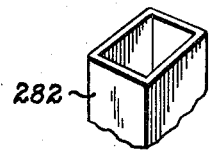

The polygonal objects 280, 281 and 282, shown in FIGS. 11–13, can also be made by the apparatus described above although the tie rods 157 must be removed and an actuator cylinder 135 provided at each payoff station 125 in order to position the guide rings 146 so that the tape 126 is applied tangentially at all times. The control device 25 is appropriately programmed to move each of the cylinders 135 to accommodate the triangular configuration 28 of FIG. 11, the haxagonal configuration 281 of FIG. 12, and the square configuration 282 of FIG. 13, as well as other polygonal configurations which can be produced in a wide range of sizes in substantially the manner described herein. Moreover, a complex shape as seen in FIG. 23 can be formed by this apparatus since the payoff head assemblies 125 apply the tape 126 tangentially to the surface of the suitably shaped mandrel. The object 284 can b ea submarine hull with the ends 285 and 286 thereof forming the top and bottom, respectively, of the mandrel.

Another important feature of the invention is that the vertical columns 11 can be made portable so that they can be taken to a remote location and erected and the tables 20 and 21 mounted thereon. In this manner, a silo or a storage tank can be erected in place on a farm or other location. To facilitate erection at such a remote spot, the base of the columns 11 must be interconnected to insure that they are properly spaced, and these columns may be collapsible to facilitate transportation thereof.

The mandrel 15 can also be made of an inflatable member which has a configuration similar to the inside configuration of the article to be wound. Such an arrangement permits each transportation, set-up, and removal after the winding operation is complete. The stationary fabricated mandrel 15, like the inflatatble mandrel and their equivalents, need not withstand torsional or sheer forces which are present when the mandrel must be rotated, and thus an important feature of this invention permits the use of a mandrel which is comparatively weak and thus is inexpensive and easy to remove. It is also possible to form the mandrel from materials which are chemically soluble so that they can easily be removed by dissolving them after the product has been completed.

The invention has thus provided apparatus for winding continuous filaments or strands around a mandrel to produce objects having a wide range of sizes and configurations. The apparatus itself can be constructed on a small scale or a very large scale, and it is contemplated that small pressure vessels as well as submarine hulls can be formed by the apparatus. The strands are applied tangentially to the mandrel under a preset amount of tension at all times. In addition, a plurality of strands are applied simultaneously in a precise position as dictated by an automatic control system, and the inner and outer tables move at high speed so that a relatively large object can be fabricated within a short period of time. As described above, the apparatus is easily modified for use in constructing the mandrel and finishing the coating thereon.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for wrapping a stationary mandrel with flexible strands of material comprising, a plurality of parallel support members spaced around the mandrel, first table means mounted on said support members and surrounding the mandrel, first drive means on said support members and said table means for effecting axial movement of said first table means, second table means mounted on said first table means between said first table means and the mandrel, means for effecting rotation of said second table means around the mandrel, a plurality of payoff head assemblies on said second table means for movement therewith to apply the strands on the outer surfaces of the mandrel in a predetermined pattern, said payoff head assemblies each including a rotary support post having one end rotatably secured to said second table means and extending parallel to the mandrel, a payoff arm on the other end of each of said rotary support posts extending generally tangentially toward the mandrel and adapted to swing with rotation of said rotary posts so that the payoff end of said arm is positioned in close proximity to the mandrel, rotary guide means on said payoff end of said arm for guiding the strands tangentially onto the mandrel, second drive means for moving said rotary support posts to position said payoff ends a preset distance from the mandrel, third drive means for rotating said rotary guide means to apply the strands to the mandrel in a flat tangential position even when the mandrel has a complex outer configuration, and control means for controlling and correlating each of said drive means to move said first and second table means and said payoff assemblies to enable the strands to be wrapped tangentially onto the mandrel in said predetermined pattern.

2. Apparatus as defined in claim 1 comprising an actuator for rotating one of said posts of said payoff assemblies, and tie rods interconnecting each of said posts so that each rotates through an identical angle in response to movement of said actuator.

3. Apparatus as defined in claim 1 wherein each of said payoff assemblies includes a bracket on said post for mounting a spool of the flexible strand material for movement with said post.

4. Apparatus as defined in claim 3 comprising means on each of said payoff assemblies for providing a drag on the strands so that a preset amount of tension is applied to each strand as it is withdrawn from said spool as said tables move with respect to the mandrel.

5. Apparatus as defined in claim 1 wherein said guide means includes a U-shaped ring over which the strand passes to be applied tangentially on to the mandrel.

6. Apparatus as defined in claim 1 wherein at least one of said parallel support members has a dovetail groove formed in the portion adjacent said first table means, and a complementary dovetail projection on the outer peripheral portion of said first table means for engaging said groove to prevent rotary movement of said first table means as it moves parallel to said support members.

7. Apparatus as defined in claim 1 wherein said first table means is annular and has a first continuous bearing member supported adjacent the inner periphery thereof, said second table means having a complementary continuous bearing member which cooperates with said first bearing member to support said second table means for rotation with respect to said first table means.

8. Apparatus as defined in claim 1 wherein said parallel support members are vertical and counterweight means are provided for reducing the load on said first drive means to enable high speed vertical movement of said first and second table means.

9. Apparatus as defined in claim 8 wherein said counterweight means includes a weight mounted for movement along one of said support members, a pulley on the upper end portion of said one support member, and cable means extending over said pulley and connecting said weight to said first table means to reduce the load on said first drive means.

10. Apparatus as defined in claim 1 wherein said payoff arm is removable from said support post, and dispensing head means is mounted on said post for applying a liquid coating to said mandrel.

11. Apparatus as defined in claim 1 wherein said payoff arm is removable from said support post, and a machining head assembly is adapted to be mounted on said support post to engage and smooth the outer surface of the mandrel.

References Cited
UNITED STATES PATENTS

| | | | |
|---|---|---|---|
| 2,344,264 | 3/1944 | Perrault | 242—11 X |
| 2,520,403 | 8/1950 | Hirsh | 242—7 |
| 2,748,831 | 6/1956 | Nash | 242—7 X |
| 3,052,419 | 9/1962 | Huck | 242—7 |
| 3,067,707 | 12/1962 | Ellzey. | |
| 3,133,236 | 5/1964 | McCauley | 242—11 X |
| 3,146,962 | 9/1964 | Hardwick | 242—2 |
| 3,174,388 | 3/1965 | Gaubatz | 242—7 X |
| 3,221,401 | 12/1965 | Scott et al. | 242—11 |
| 3,255,976 | 6/1966 | Mede | 242—7 |

BILLY S. TAYLOR, *Primary Examiner.*